J. B. FOURNIER.
APPARATUS FOR CONTROLLING THE FLOW OF FLUID.
APPLICATION FILED MAR. 2, 1914.

1,200,720.

Patented Oct. 10, 1916.
2 SHEETS—SHEET 1.

J. B. Fournier,
Inventor.

By
Attorney.

J. B. FOURNIER.
APPARATUS FOR CONTROLLING THE FLOW OF FLUID.
APPLICATION FILED MAR. 2, 1914.

J. B. Fournier.
Inventor.
By
Attorney.

UNITED STATES PATENT OFFICE.

JOSEPH BARBE FOURNIER, OF ST. MANDÉ, FRANCE.

APPARATUS FOR CONTROLLING THE FLOW OF FLUID.

1,200,720.  Specification of Letters Patent.  Patented Oct. 10, 1916.

Application filed March 2, 1914. Serial No. 822,059.

*To all whom it may concern:*

Be it known that I, JOSEPH BARBE FOURNIER, a citizen of the French Republic, and residing at No. 2 Rue Paul Bert, in St. Mandé, Seine, France, have invented certain new and useful Improvements in Apparatus for Controlling the Flow of Fluid, of which the following is a specification.

This invention has for its object to provide an improved apparatus for controlling the flow of gases, liquids or vapors (all hereinafter included under the term fluid).

This invention is based on the following principle. Namely, if a completely closed hollow vessel filled with a fluid under pressure be immersed in a medium in which a determined pressure exists, according to known physical laws these elementary pressures, however great, will act at right angles at all points of the walls of the said vessel, so that the resultant of all these elementary pressures will be *nil*, and therefore the vessel will remain at rest under those conditions. The co-existence of all these elementary pressures is therefore necessary in order that the vessel shall remain at rest. Now if any one portion of the wall of the vessel be removed upon which the resultant of the elementary pressures is equal to F, in such a manner as to place the interior of the vessel in communication with the outside medium, and if by a suitable supply of fluid to the inside of the vessel, the original pressure in the interior of the vessel be maintained constant, the said vessel will be acted upon by the force F tending to cause the said vessel to move in a determined direction. It is obvious that if a force greater than the force F but having the same direction, be caused to react upon a portion of the external surface of the vessel, the said vessel will move in the direction in which this new force acts. By this means it will, therefore, be possible to produce a rectilinear to-and-fro motion of the vessel or even a curvilinear motion, according to the practical requirements of the purpose in view.

This invention may be carried into effect in various ways. Two embodiments of this invention are illustrated by way of example in the accompanying drawings, in which—

Figure 1:
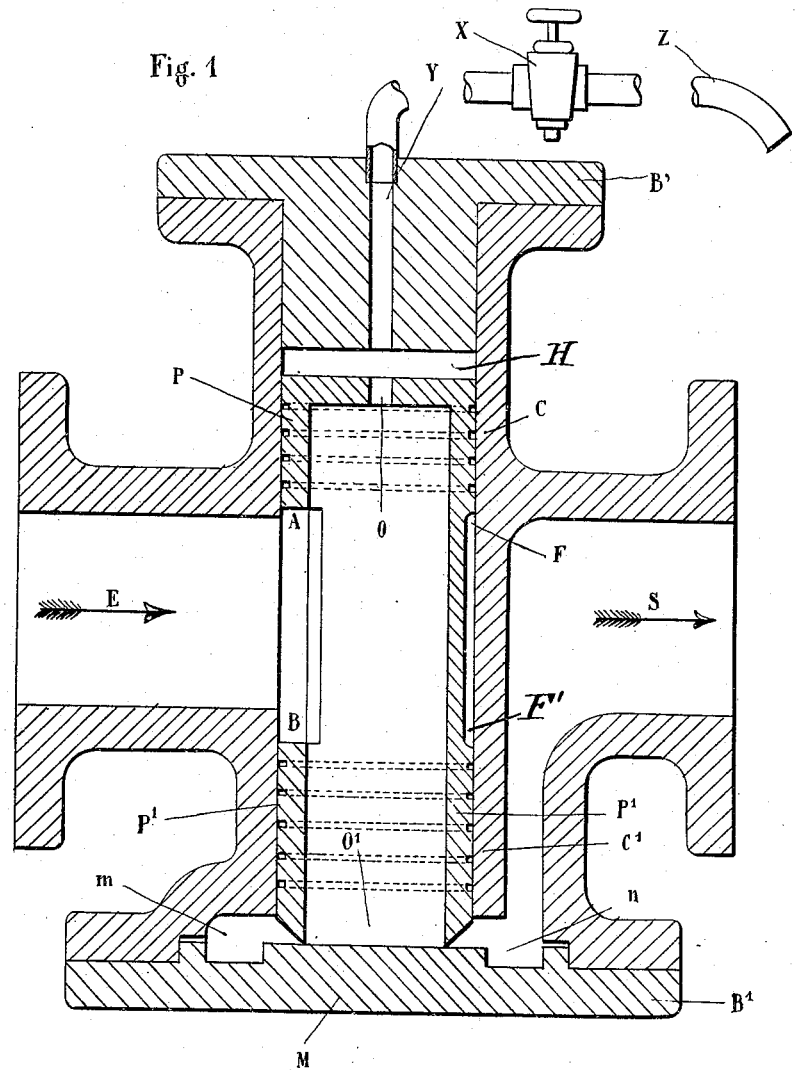
Figure 2:
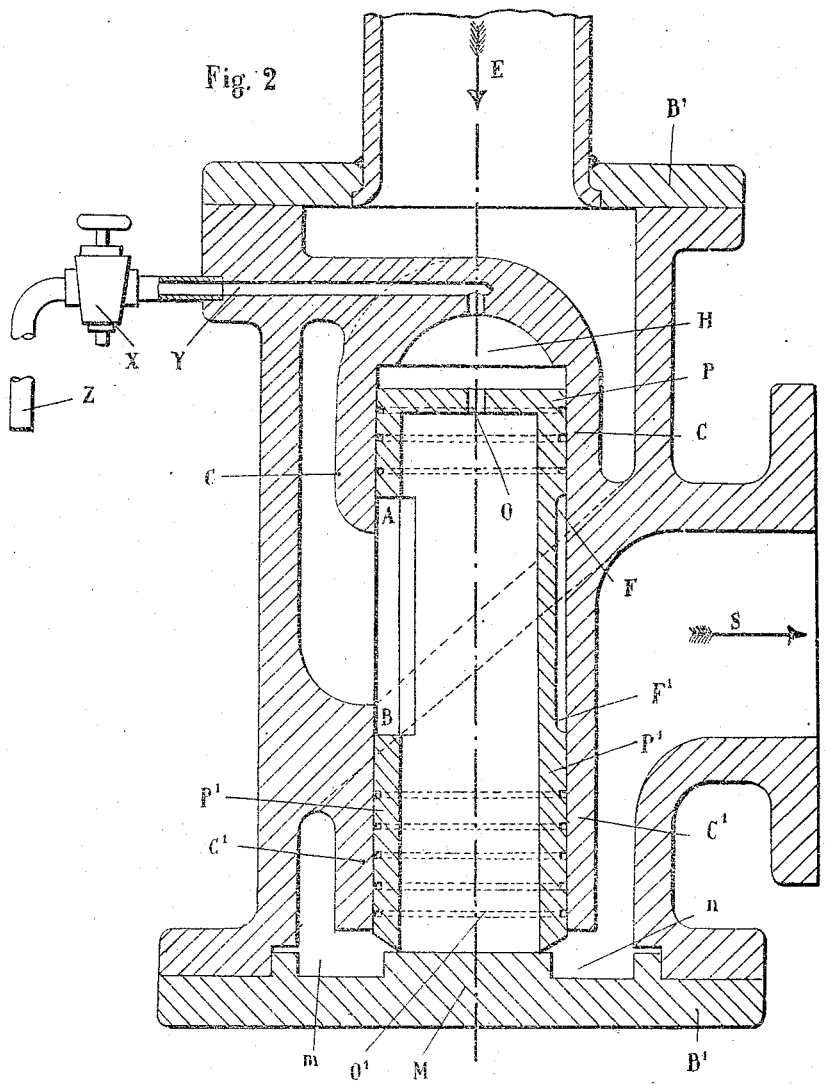

Figure 1 is a vertical axial section of one embodiment of an apparatus constructed according to the invention and Fig. 2 is a vertical axial section of a modification.

Referring to Fig. 1, $CC^1$ is a cylinder bored to receive a hollow piston $PP^1$ adapted to work inside the same. This piston has a lateral aperture AB and its upper and lower ends are pierced with orifices O and $O^1$. The proportion between the cross sections of these orifices O and $O^1$ may vary according to the practical requirements of the purpose in view. The lower edge of the piston $PP^1$ is cut in the shape of a circular bevel with a more or less sharp edge adapted to seat itself upon a jointing surface M fixed to a removable cover $B^1$. The upper end of the cylinder $CC^1$ is closed by a removable cover $B^1$ formed with a central aperture in which there is soldered a flexible pipe YZ, the internal cross sectional area of which has a determined ratio to the cross sectional area of the orifice O formed in the upper end of the hollow piston $PP^1$. The flexible pipe is provided at a determined distance from the apparatus, with a device such as a tap X, cock, valve or equivalent, capable of shutting off or opening a communication between the chamber H and the atmosphere or with another outer chamber.

The metal casing in which the cylinder $CC^1$ is formed is provided with two apertures E and S intended respectively for the inflow and outflow of the fluid into and from the improved apparatus. A circular groove $FF^1$ of a few millimeters in depth and of a height exactly equal to the height AB of the lateral aperture provided in the piston $PP^1$ is formed in the thickness of the side wall of the piston in order that the pressures acting upon the sides of the piston shall approximately counter-balance one another, so as not to hinder its movement in the cylinder.

If now fluid under pressure be admitted through the aperture E, the tap X being open and thus establishing communication with, for instance, the atmosphere, then the said fluid will fill the cavity of the piston $PP^1$ and will exert upon each element of the wall of said piston a pressure which is at right angles to said element. The resultants of these elementary pressures upon the two opposite ends of the hollow piston $PP^1$ will produce upon the said ends two directly opposed forces having opposite directions along the axis of the cylinder. The resultant forces of these two individual forces will cause the piston to move in one or the other direction according to the proportion between the cross sections of the orifices O and O¹. In the following description it will be assumed that the cross sectional areas of the orifice O¹ and pipe YZ are greater than the cross sectional area of the orifice O.
In these circumstances, the piston will be forced to move in the direction of O¹—O, and the orifice O¹ will thus be placed in communication with the annular space m n so that the fluid can then flow through the aperture S to the point where it is to be used. During the whole of the time of this outflow a portion of the fluid will flow out through the orifice O into the flexible pipe YZ and out through the tap X on said pipe into the atmosphere or other desired place.

If at any moment the tap X be closed, that part of the flexible pipe situated in front of the tap X, as well as the chamber H will become filled with fluid which will soon acquire a pressure equal to the initial pressure of the fluid which is to be delivered, that is to say, equal to the pressure acting upon the inner surface of the upper end of the piston PP¹. This pressure produces upon the outer surface of the said end a force having the direction O—O¹ and its force will be greater than the force produced by the same pressure in the opposite direction upon the inner surface of the same end of the piston. The consequence will be that the piston will move down again and the beveled edge around the orifice O¹ will seat itself upon the surface M and thus stop the outflow of the fluid through the orifice O¹. It will thus be seen that by alternately opening and closing the tap X, the outflow of the fluid through the aperture S can be caused to take place or can be stopped accordingly.

In cases where the fluid of which the flow is to be controlled consists of saturated vapor, the metal casing of the apparatus may become unequally heated at its various points, that is, the circulation of the vapor has the result of lowering its temperature and therefore those parts of the casing which come first in contact with the vapor will remain the hottest. Therefore, the temperature of the vapor will be higher at the inflow orifice E and in the hollow piston PP¹ than in the chamber H and since the pressure of the saturated vapor increases and diminishes with its temperature, this pressure in the chamber H will be lower than the pressure inside the hollow piston PP¹. Consequently, if the tap X be closed, it may happen according to the relative temperatures of the vapor in the chamber H and inside the hollow piston, that the pressure of the vapor upon the upper end of the piston may be insufficient to cause the said piston to move down into the position it must occupy in order to cut-off the outflow of the fluid.

The modification shown in Fig. 2 is designed to obviate the above stated drawback. In this modification the casing of the apparatus consists of two concentric cylinders, the inner cylinder CC¹ in which the piston PP¹ works and the outer cylinder which forms a sort of jacket around the inner cylinder. The annular space comprised between these two cylinders is divided into two compartments separated by a fluid-tight partition which also serves to connect the two cylinders together. Owing to this partition, the vapor is unable to pass from the upper compartment into the lower compartment except by first passing through the aperture AB in the hollow piston and the aperture O¹ formed in the lower end of the said piston. Thus the vapor in passing through the apparatus is caused to pass around the outer walls of the chamber H before being cooled by contact with the other parts of the appartus. Therefore the temperature of the vapor and consequently its pressure will be highest and greatest in the chamber H, with the result that the piston will always move down when the tap X is closed.

The pipe YZ may be of any desired length and therefore the movements of the piston PP¹ may be controlled at any desired distance away from the apparatus. Further, by alternately closing and opening the tap X, the piston PP¹ may be made to move to-and-fro in the same manner as is done by means of the slide valve of a steam engine.

It is to be understood that the fluid the discharge of which is to be controlled by the improved apparatus may be allowed to discharge equally well into a closed chamber or into the open air.

Having now described my invention, what I claim as new and desire to secure by Letters Patent is:—

1. Apparatus for controlling the flow of fluid comprising a casing, inlet and outlet passages formed therein, a hollow piston slidable in said casing, a port in the wall of said piston adapted to maintain the interior of the piston in communication with the inlet passage, a comparatively small orifice leading from the interior of the piston to a chamber formed by the casing and one end of the piston, a comparatively large orifice at the other end of the piston adapted to be moved into and out of communication with the outlet by movement of the piston, and means for controlling the outlet of fluid from said chamber.

2. Apparatus for controlling the flow of fluid comprising a casing, inlet and outlet passages formed therein, a hollow piston slidable in said casing, a port in the wall of said piston adapted to maintain the interior of the piston in communication with the inlet passage, a comparatively small orifice leading from the interior of the piston to a chamber formed by the casing and one end of the piston, a comparatively large orifice at the other end of the piston adapted to be moved into and out of communication with the outlet by movement of the piston, a valve edge formed on the latter end of the piston, a seating surface on the casing for said valve edge, and means for controlling the outlet of fluid from said chamber.

3. Apparatus for controlling the flow of fluid comprising a casing, inlet and outlet passages formed therein, a hollow piston slidable in said casing, a port in the wall of said piston adapted to maintain the interior of the piston in communication with the inlet passage, an annular groove around the exterior of said piston adjacent said port, a comparatively small orifice leading from the interior of the piston to a chamber formed by the casing and one end of the piston, a comparatively large orifice at the other end of the piston adapted to be moved into and out of communication with the outlet by movement of the piston, and means for controlling the outlet of fluid from said chamber.

4. Apparatus for controlling the flow of fluid comprising a casing, inlet and outlet passages formed therein, a hollow piston slidable in said casing, a port in the wall of said piston adapted to maintain the interior of the piston in communication with the inlet passage, a comparatively small orifice leading from the interior of the piston to a chamber formed by the casing and one end of the piston, a comparatively large orifice at the other end of the piston adapted to be moved into and out of communication with the outlet by movement of the piston, and means for controlling the outlet of fluid from said chamber, said inlet passage surrounding that part of the casing which forms said chamber.

In testimony whereof I have signed my name to this specification in the presence of two subscribing witnesses.

JOSEPH BARBE FOURNIER.

Witnesses:
  HANSON C. COXE,
  GUSTAVE DUMONT.